United States Patent [19]

Wintzer

[11] 4,061,879
[45] Dec. 6, 1977

[54] METHOD AND APPARATUS FOR TRANSMITTING DIGITAL INFORMATION SIGNALS FROM SIGNAL TRANSMITTERS TO SIGNAL RECEIVERS OVER SWITCHING APPARATUS

[75] Inventor: Klaus Wintzer, Munich, Germany

[73] Assignee: Siemens Aktiengesellschaft, Munich, Germany

[21] Appl. No.: 617,526

[22] Filed: Sept. 29, 1975

[30] Foreign Application Priority Data

Sept. 30, 1974 Germany ............................ 2446696
Apr. 30, 1975 Germany ............................ 2519445
May 22, 1975 Germany ............................ 2522759

[51] Int. Cl.² ............................................. H04J 6/00
[52] U.S. Cl. ........................... 179/15 BA; 179/15 AT
[58] Field of Search ........ 179/15 BA, 15 BV, 15 AT, 179/15 AQ, 18 FC, 18 GF

[56] References Cited

U.S. PATENT DOCUMENTS

| 3,643,030 | 2/1972 | Sparrendahl | 179/15 BA |
| 3,890,469 | 6/1975 | Kelly | 179/15 AQ |
| 3,894,189 | 7/1975 | Edstrom | 179/15 AQ |

OTHER PUBLICATIONS

Engineering Electronics by John D. Ryder, 2nd Ed., copyright 1967 by McGraw-Hill, p. 413.
Applied Physics Lab (APL) Technical Digest, Sept.-Oct. 1971, "A Time Division Multiplexing System . . ." by Appel et al., p. 212.

Primary Examiner—David L. Stewart
Attorney, Agent, or Firm—Schuyler, Birch, Swindler, McKie & Beckett

[57] ABSTRACT

A method and apparatus are described for transmitting, over switching apparatus, digital information signals, together with a preceding address signal, wherein the address signal indicates a signal receiver capable of receiving the information signals in any time sequence. The information signals emanating from a given signal transmitter, prior to being transmitted to the switching apparatus, are individually stored, and only after a predetermined number of information signals are present are the information signals and related address signals transmitted. In the switching apparatus the address signal is used to establish a connection between the switching apparatus input and the switching apparatus output connected to the addressed signal receiver only for the period during which the information signals are transmitted.

19 Claims, 4 Drawing Figures

METHOD AND APPARATUS FOR TRANSMITTING DIGITAL INFORMATION SIGNALS FROM SIGNAL TRANSMITTERS TO SIGNAL RECEIVERS OVER SWITCHING APPARATUS

BACKGROUND OF THE INVENTION

This invention relates to a method and apparatus for transmitting digital information signals capable of being emitted from signal transmitters, together with an address signal preceding the information signals, and indicating a signal receiver capable of accepting the information signals in any time sequence. The information signals are transmitted over switching apparatus toward the signal receiver designated by the address signal associated therewith.

The technique of transmitting information signals from a signal transmitter to a signal receiver, together with an address code designating the information signal receiver intended for acceptance of the information signal in question, has been previously disclosed ("NTF" 40 (1971), pp. 115–118). Such information signals, each provided with an address code, are each transmitted in a given time segment of a pulse frame comprising a prespecified number of time segments, whereby the time segments appearing with the same time position in successive pulse frames belong to a given time slot. Although with this information signal transmission no information must be stored indicating in what time slot the information signals intended for a signal receiver must be transmitted, nevertheless, the information transmission system in question is limited in its transmission capacity by the number of time slots present in each pulse frame, because only the same number of connections can be established is there are time slots within a pulse frame on the telecommunication circuit.

With reference to the above mentioned commonly known address code modulation system, it is known ("NTF" 40 (1971), pp. 119, 120) to transmit information signals in a mobile radio network in such a manner that always a prespecified number of bits are combined into a block and sent together with an address code word to a called station in a time slot detected as free within a frame comprising a specified number of time slots. However, this occurs in such a manner that a specified portion of the group of bits are transmitted in appropriate time positions of successive frames. This, however, provides no information as to what happens when the signals are switched.

It is an object of the invention to provide a method of and apparatus for transmitting in a relatively simple manner information signals emitted from signal transmitters, together with address signals indicating the signals receivers designated to accept the information signals, over switching apparatus toward the designated signal receiver and, at the same time increasing the number of communication links extending over the switching apparatus.

SUMMARY OF THE INVENTION

In accordance with the invention, the foregoing and other objects are achieved in that the information signals from a particular signal transmitter are individually stored prior to their emission to the switching network, and not until a prespecified number of information signals are present, will the information signals be emitted from the signal transmitter. Each information signal is transmitted together with an address signal designating the desired signal receiver to the switching apparatus. In the switching apparatus a connection is established by the address signal between te switching apparatus input carrying the address signal and associated information signals and the switching apparatus output connected to the desired signal receiver. The connection is established only for the period during which the information signal are being transmitted.

The invention has the advantage that one can transmit information signal in a relatively simple manner from signal transmitters to signal receivers over a switching apparatus. It also has the advantage that, as has been demonstrated, due to the operation of the switching matrix arrays only for the duration of the transmission of the information signals and of the associated address signals designating the signal receiver desired in each particular case, the switching matrix arrays can be utilized for establishing a greater number of communication paths than has heretofore been possible. This proves particularly advantageous in the case of transmitters that send out signals at a relatively lower repetition rate in relation to the maximum repetition rate capable of being transmitted by other signal transmitters and in elation to the transmission frequency on the telecommunication circuit which includes the switching apparatus.

To carry out the method according to the invention, it is advantageous to use a switching arrangement wherein a signal transmitter and a signal receiver are connected by means of a common send/receive circuit to an input and an output of a space-division multiplex switching apparatus. Further, there is allocated to the signal transmitter in the send/receiver circuit a storage for storing the address signal of a signal receiver which will accept information signals. There is associated with the signal receiver in the send/receiver circuit being used a storage accepting only a prespecified number of information signals.

A control circuit is associated with either storage, and the control circuit associated with the first-mentioned storage is so designed that it initiates the delivery of signals to the switching apparatus after the associated signal transmitter has delivered a prespecified number of information signals. The control circuit associated with the second-mentioned storage is so designed that it initiates the output of the information signals contained in it to the associated signal receiver only if a prespecified number of information signals have been stored in it. This has the advantage that a relatively small number of circuit elements are necessary for the transmission of information signals from signal transmitters to signal receivers over a switching network.

According to one embodiment of the invention, the storages are formed by registers. This results in the advantage of a very small number of circuit elements for each send/receive circuit.

According to another embodiment of the invention, the first-mentioned storage is formed by two registers, of which one register is capable of storing only the address signal designating a desired signal receiver and, as required, also other signals designating type of information signals to be applied thereto and/or synchronizing signals, and of which the other register is capable of storing only the prespecified number of information signals. The result is a very simple and clearly designed circuit for the registers.

According to another embodiment of the invention, the control circuits each contain a clock generator which is connected at its output, by a switch, to the control inputs of the associated register. Moreover, the input of a counter is connected to the output of the clock generator by the switch. The counter has a counting capacity corresponding to the maximum number of signals capable of being stored in the register. The counter output is connected to the reset input of a bistable circuit which is coupled, with its output carrying in the set state, a "1" signal, to the operating input of the switch. A "1" signal is applied to the set input of the bistable circuit whenever the readout of the signals contained in the associated register is to take place. This results in the advantage that a very small number of circuit elements are necessary for the control circuits provided.

According to another embodiment of the invention, there is connected to the switching apparatus inputs coupled to the signal transmitters and to the switching apparatus outputs coupled to the signal receivers a control device. The latter control device accepts the address signal delivered by a signal transmitter and checks its output as designated by the address signal. It then allows a switching path usable for the connection of the proper switching apparatus input and of the suitable switching apparatus output to be actuated solely for the duration of the subsequent transmission of the prespecified number of information signals. This results in the advantage of a very simple control of the switching apparatus.

According to still another embodiment of the invention, the signal transmitter connected to a send/receive circuit and the signal receiver connected to the same send/receive circuit are formed by a subscriber station emitting and accepting digital signals. This produces the advantage of having a very simple connection facility between the particular signal transmitters and signal receivers and the send/receive circuits associated therewith.

According to the method in accordance with the invention, the signal transmission proceeds in such a manner that in individual switching matrix arrays forming the switching apparatus and pertaining to a plurality of interconnected switching centers of a telecommunication network, the information signals present in the prespecified number are transmitted in such a manner, with their address signal designating the signal receiver described in each case, from the switching center at which the signal transmitter is connected to another switching center at which the desired signal receiver is connected. The signals in question are retransmitted from one switching center to another switching center connected thereto in accordance with information stored in the individual switching centers indicating the switching center suitable as the next switching center from the respective switching center for the activation of the desired signal receiver. The switching matrix arrays in the switching centers suitable for the retransmission of the signals are initiated only for the period during which the signals concerned are being transmitted.

In this way, one achieves the advantage that in relatively simple fashion information signals can be transmitted from signal transmitters to signal receivers over switching apparatus formed by individual switching matrix arrays in a plurality of interconnected switching centers of a telecommunication network.

In addition, the invention has the advantage that, as has been demonstrated, due to the initiation of the switching matrix arrays only for the duration of the transmission of the information signals and of the address signals, the switching matrix arrays can be utilized for establishing a greater number of communication links than has heretofore been possible. This is particularly true for signal transmitters emitting signals at a relatively lower repetition rate in relation to the maximum repetition rate of the signals capable of being transmitted by other signal transmitters and in relation to the transmission frequency on the telecommunication circuit containing the switching matrix arrays.

According to another embodiment of the invention, prior, or in addition, to a first transmission of information signals from a switching center, at which the signal transmitter is connected, to a switching center, at which the desired signal receiver is connected, an address signal designating the transmitting signal transmitter is sent from the first-mentioned switching center to the second-mentioned switching center, in addition to the address signal designating the signal receiver. Furthermore, the two address signals are stored in the switching center to which the desired signal receiver is connected. Thus, one achieves the advantage of being able to avoid in a simple way the creation of double connections, because by simple comparison of such address signals with the address signals stored in the switching center with which the signal receiver desired in each case is associated, a decision can be made as to whether a connection already exists to that signal receiver. In this case, an appropriate seizing signal could be sent, as required, to the signal transmitter now transmitting information signals, in response to which such information signal transmission is stopped.

According to a further embodiment of the invention, when the emission of information signals is terminated, an address signal designating the signal receiver to be used is fed by the signal transmitter to the switching center connected to the signal receiver together with an erase signal, and with the aid of these signals the information with respect to the signal transmitter and to the signal receiver stored in the switching center is erased. Where necessary, a clearing signal indicating that the application of information signals is terminated is fed to the signal receiver. This results in the advantage that the disconnection of the signal receiver can be triggered from the signal transmitter, from which information signals have previously been emitted, by that signal transmitter.

According to still another embodiment of the invention, when the signal receiver is disconnected, or when no further information signals are needed from the signal transmitter, an erase signal is transmitted from the switching center connected to the signal receiver, together with the address signal designating the signal transmitter, to the switching center connected to the signal transmitter, from which an appropriate indicating signal is emitted to the signal transmitter. This signal is used in the switching center connected to the signal receiver to erase the information stored with respect to the signal transmitter and to the signal receiver. The resultant advantage is that the disconnection of the signal transmitter can relatively simply be effected from the signal receiver, to which heretofore information signals have been fed from the signal transmitter.

To carry out the above mentioned method in accordance with the teachings of the invention, it is advantageous to employ a circuit arrangement having a buffer memory connected to each switching center at its signal input; the buffer memory accepts and buffers the signals fed to the switching center and does not emit them to the switching matrix array allocated to the switching center until the switching matrix array has been set. A control circuit for setting the switching center is connected to the switching matrix array and the control circuit is activated from a separate control storage connected at the incoming end to an output of the buffer memory. The buffer memory accepts from the control circuit the address of the desired signal receiver and thereafter emits a setting signal used to properly adjust the associated switching matrix array. The resultant advantage is a very small number of circuit elements for accepting, buffering and retransmitting the respective signals to the individual switching centers.

According to a specific structure of the switching arrangement, each buffer memory includes an address memory for accepting and storing an address signal designating a signal receiver and a signal storage for accepting the information signals appearing together with the address signal and/or the address signal designating a signal transmitter. Furthermore, the incoming end of the control storage is connected at the outgoing end of the address storage, resulting in the advantage that a relatively small number of circuit components are needed for the buffer memory.

According to another embodiment of the invention, the control storage is so organized that information is stored therein for all the signal receivers within the telecommunication network which is accessible from its associated switching center. This information indicates which switching center it to be used as next switching center for a signal transmission to a desired signal receiver. A control circuit connected to the switching matrix array of the associated switching center allows an appropriate adjustment of the switching matrix array in response to the reception of such information. This results in the advantage that the switching matrix array can be adjusted relatively simply.

According to a further embodiment of the invention, the signal transmission proceeds in a manner such that in individual switching matrix arrays forming the switching apparatus in a plurality of interconnected switching centers of a telecommunication network the information signals present in the prespecified number are transmitted together with addresses indicating the desired signal receiver. They are transmitted from the switching center at which the signal transmitter is connected to another switching center at which the desired signal receiver is connected in accordance with addresses indicating the switching centers of the telecommunication network to be utilized. The addresses are added at the signal transmitter to the information signals and to the address indicating the desired signal receiver. The switching matrix arrays in the switching centers to be employed for the retransmission of the information signals (and, where necessary, of addresses) and activated sequentially in accordance with the addresses, are actuated only for the duration of a signal transmission.

This results in the advantage that in a relatively simple manner information signals can be transmitted from signal transmitters to signal receivers over switching apparatus formed by individual switching matrix arrays of a plurality of interconnected switching centers of a telecommunication network. Another advantage is that, as has been demonstrated, since the switching matrix arrays are actuated only for the duration of the transmission of the information signals and the addresses, these switching matrix arrays can be used for establishing a greater number of communication links, than has heretofore been possible. This is particularly true for signal transmitters that send out signals at a relatively lower repetition rate in relation to the maximum repetition rate of the signals capable of being transmitted by other signal transmitters and in relation to the transmission frequency on the telecommunication circuit in which the switching matrix arrays are located.

According to still another embodiment of the invention, of the addresses accepted by a switching center, the address indicating a switching center to be activated from the switching center as the next switching center is not retransmitted. This results in the advantage that one can establish relatively simply the address to be considered as the next address.

According to still another embodiment of the invention, in the case of sequentially appearing addresses designating the switching centers to be used, one after the other, for a signal transmission and the desired signal receiver, the first address in the respective switching center is written into a separate address register by means of a control device, the switching matrix array of the switching center is set for the signal transmission. Where necessary, for address transmission, the addresses following the first address and the information signals, if necessary, after an interval taking into account the adjustment period for the switching matrix array, are retransmitted to the relevant switching center over the switching matrix array. This results in the advantage that information signals and addresses can very simply be processed in the individual switching centers.

According to yet another embodiment of the invention, before or in addition to a first transmission of information signals from the switching center at which the signal transmitter emitting such information signals is connected to the switching center at which the desired signal receiver is connected, an address is transmitted designating the signal transmitter from the first-mentioned switching center to the second-mentioned switching center in addition to the aforesaid address. Moreover, the address designating the signal transmitter is stored in the switching center to which the signal receiver is connected, together with the address designating the signal receiver. This results in the advantage that one can relatively simply avoid the buildup of double connections, because by simply comparing such addresses with the addresses stored in the switching center to which the signal receiver desired in each case belongs, a decision can be made in the switching center if there exists a connection to the signal receiver concerned. In this case one may, as required, transmit an appropriate seizing signal to the signal transmitter now transmitting information signals, in response to which such a transmission of information signals is stopped.

According to another embodiment of the invention, when the emission of information signals by the signal transmitter from the switching center, at which it is connected, is terminated, an erase signal is emitted, together with the addresses designating the switching centers to be utilized for a signal transmission toward the signal receiver concerned. Furthermore, with the aid of the erase signal, together with the address designating the desired signal receiver, the information stored relative to the signal transmitter and the signal receiver is erased and, where necessary, a clearing signal indicating that the feeding of information signals is terminated is fed to the signal receiver. This results in the advantage that one can relatively simply trigger, from the signal transmitter, the disconnection of the signal receiver to which information signals have previously been supplied by that signal transmitter.

According to still another embodiment of the invention, if the signal receiver is disconnected, or no further information signals are needed by the signal transmitter, an erase signal is provided from the switching center at which the signal receiver is connected, together with addresses indicating the signal transmitter and the switching centers to be utilized for the transmission of the erase signal toward the switching center designating the signal transmitter. Moreover, in the switching center at which the signal transmitter is connected, an appropriate adjusting signal is applied to the signal transmitter. Furthermore, in the switching center at which the signal receiver is connected the information relative to the signal transmitter and the signal receiver stored therein is erased. This results in the advantage that one can relatively simply disconnect the signal transmitter from the signal receiver to which information signals have heretofore been supplied.

To carry out the above described method in accordance with the teachings of the invention, it is useful to employ in each switching center a switching arrangement wherein the switching matrix array of the switching center is connected at its incoming end to the output of a temporary-storage device to which are applied signals fed to the switching center. An address signal register is connected to the input of the temporary-storage device. The address signal register permits the switching matrix array to be controlled over an allocation storage and a control circuit. The temporary-storage device retransmits the signals applied thereto after a time lag governed by the adjustment time for the associated switching matrix array. This results in the advantage that only a very small number of circuit elements are needed for the acceptance, temporary storage and retransmission of the respective signals to the individual switching centers.

BRIEF DESCRIPTION OF THE DRAWINGS

The principles of the invention will be more readily understood by reference to the description of preferred embodiments given hereinbelow in conjunction with the drawings, which are described briefly in the following.

DETAILED DESCRIPTION OF THE PREFERRED EMBODIMENTS

Figure 1:
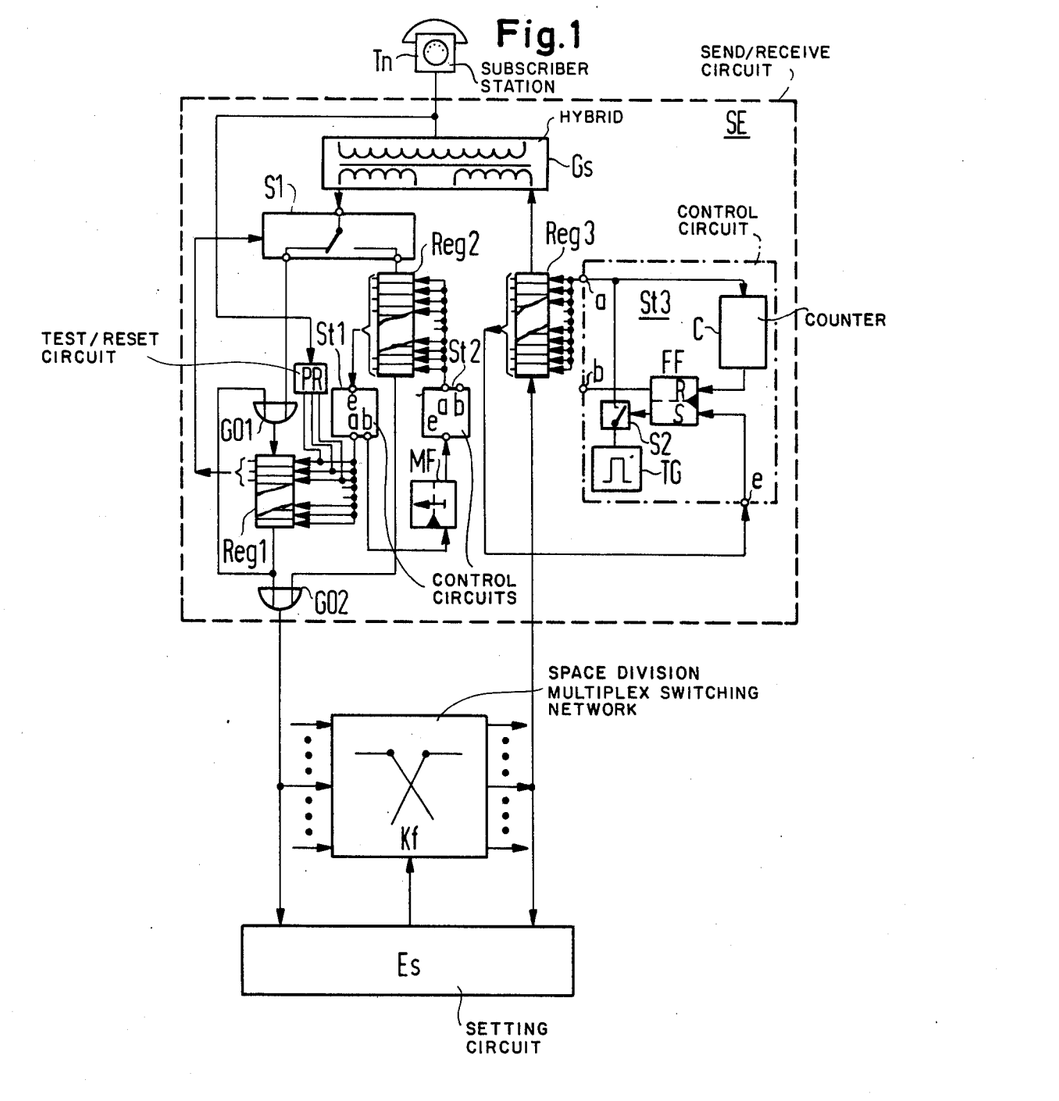
FIG. 1 is a schematic diagram illustrating the basic structure of a send/receive circuit connected to switching apparatus.

FIG. 1 illustrates a switching arrangement to be referred to as send/receive circuit SE, by which a subscriber station T$n$ is connected to switching apparatus K$f$. The subscriber station T$n$ may comprise a signal transmitter, as well as a signal receiver. In this connection it is further assumed that the signal receiver of the subscriber station T$n$ is capable of accepting digital signals and that the signal transmitter of the subscriber station T$n$ is capable of delivering such signals. Preferably, digital signals are understood to mean PCM signals, i.e., speech signals and/or data signals appearing at varying frequencies and rates.

The switching apparatus K$f$ shown in FIG. 1 is a space-division multiplex switching network. Thus, the switching network K$f$ permits space-division switching, or connection between its inlets and outlets. To carry out these switching functions, a setting circuit E$s$ is connected to the switching network K$f$, to all the inputs and all outputs of the switching network K$f$.

As will be described below, after accepting an address signal from a specified incoming circuit of the switching network K$f$ and testing the outgoing circuit thereof designated by the address signal, the setting network causes a switching path to be switched from a given input to a given output of the switching network K$f$ in response to the determined busy/idle condition. In this connection it should be noted that the switching network K$f$ and the setting circuit E$s$ are constructed and operated in the manner described in British Pat. No. 1,077,679, and as is well known, more advanced electronic components can be used to perform the functions carried out by these devices. The interconnections and interoperations for the latter two components are as described in the aforementioned reference. Their interconnections and interoperations with the remainder of the circuitry herein are as described hereinbelow.

The send/receiver circuit SE is allocated to a signal transmitter associated with a subscriber station T$n$ and to a signal receiver associated with the same subscriber station. Therefore, the send/receive circuits are provided in the same number as the subscriber stations.

Each send/receive circuit basically comprises two storages formed in this case by registers. One storage is formed by the two registers Reg1 and Reg2, and the other storage by the register Reg3. The registers may be constructed as binary shift registers.

Prior to describing the structure of the send/receive circuit SE of FIG. 1 and, specifically, before going into the details of the size of the registers Reg1, Reg2 and Reg3, the basic organization of the switching arrangement of FIG. 1 will first be considered. As noted earlier, the subscriber station T$n$ is capable of delivering and accepting digital signals which may particularly be constituted by PCM signals. The register Reg2 may have a storage capacity such that it is capable of storing 492 bits of the digital signals. The same is true of register Reg3. Register Reg1 which, as will be described below, is capable of storing address signals, or bits forming the address signals, and, where necessary, also other bits particularly designating the type of the information signals and/or synchronizing signals to be provided, may have a storage capacity for 20 bits. The bits contained in register Reg1 may be arranged as follows: 8 bits form a synchronous word, 8 bits form the address of a signal receiver, 1 bit serves for parity purposes, and 3 bits serve for designating the type of the information signals or bits to be applied to the signal receiver.

Register Reg1 of the send/receive circuit SE of FIG. 1 is connected by its signal input to an OR element GO1 and then to an output of a switch S1 designated as the rest side. The output of switch S1 designated as the operating side is connected to the signal input of register Reg2. The switch arm of switch S1 is connected to the transmission end of a hybrid circuit Gs, to which the subscriber station Tn is connected. The transmission end of the hybrid circuit Gs is understood to mean the end over which th hybrid circuit provides signals. The hybrid circuit also has a receiving end, i.e., the end of the hybrid circuit Gs over which it accepts signals, and at which, the register Reg3 is connected by its signal output 30. The signal output of register Reg1 and the signal output of register Reg2 are jointly connected to an input of the switching network Kf and to an input of the setting circuit Es by an OR element GO2. The signal output of register Reg1 is further connected to the signal input of the register Reg1 by the OR element GO1.

At the receiving end, register Reg3 is connected by its signal input to an output of the switching network Kf and to another input of the setting circuit Es, designated as a test input.

In addition to the signal inputs mentioned above, the registers Reg1, Reg2 and Reg3 have a number of control inputs corresponding to the number of their register stages. These control inputs are coupled together and jointly connected to output a of each of the control circuits to be detailed below. Thus, the control inputs of register Reg1 are jointly connected to the output a of a control circuit St1, and, similarly, the control inputs of register Reg2 are connected to output of a control circuit St2. The control inputs of register Reg3 are jointly connected to output a of the control circuit St3 of FIG. 1. It should be noted that all the control circuits St1, St2, and St3 may be similarly constructed and, for example, have the construction shown with reference to control circuit St3. The latter device will be described in detail below.

Control circuit St1 is connected by an input e to the outputs of the register stages of register Reg2. The connection of the outputs of the register stages of register Reg2 to input e of control circuit St1 may be such that input e of control circuit St1 carries a "1" signal whenever register Reg2 is filled with a prespecified number of information signals or bits. To achieve this, appropriate recognition circuits (not shown in FIG. 1) may be inserted in the relevant connection.

Control circuit St1 is connected by a separate output b over a monostable circuit MF to input e of control circuit St2, which is connected by its output a to the control inputs of register Reg2.

Control circuit St3 is connected by its output a to the control inputs of the register stages of register Reg3. Input e of control circuit St3 is connected to the outputs of the register stages of register Reg3 in the same way that input e of control circuit St1 is connected to the outputs of the register stages of register Reg2.

The outputs of a test/reset circuit PR are connected to the inputs of specified register stages of register Reg1, i.e., the register stages in which, as will be described below, the address of a desired signal receiver, or of a desired subscriber station, is contained. At the receiving end, the test/rest circuit PR is connected to the associated subscriber station Tn, at least to the signal transmitter of said subscriber station. The test/reset circuit PR serves to erase the corresponding register stages of register Reg1, when the delivery of information signals by the signal transmitter of the subscriber station Tn is completed, particularly when the handset of the subscriber station is replaced.

The test/reset circuit PR may, for example, be a potential monitoring circuit which is connected at its output to specified erase inputs of the register Reg1 over decoupling elements. The switching input of switch S1 is connected to the outputs of the register stages of register Reg1 intended for the address signals delivered to the signal transmitter of the subscriber station Tn. Appropriate switching means may be inserted in the connection, e.g., between the outputs of register stages Reg2 and input e of control circuit St1. The arrangement may be effected such that when an address signal is fully accepted in the register stages of register Reg1, an enabling signal is applied to switch S1 over the connection for the switchover thereof. This will be further explained below.

As mentioned earlier, control circuits St1, St2 and St3 in the switching arrangement of FIG. 1 may have the same construction. This construction is shown in detail in FIG. 1 with respect to control circuit St3.

A bistable circuit FF is connected by its set input S to input e of control circuit St3. Reset input R of the bistable circuit FF is connected to the output of a counter C. The output of the bistable circuit carrying a "1" signal in the set status of bistable circuit FF is connected to the switching input of a switch S2, through which a clock generator TG is capable of delivering pulses, both to the input of the counter C and to the output a of the control circuit St3. Finally, output b of control circuit St3 is connected to the output of bistable circuit FF carrying a "1" signal. Output b is utilized for control circuit St3, and also for control circuit St2; in these cases, the corresponding connection between the output of bistable circuit FF and output b need not be used. Only with the control circuit St does one utilize the output b in the present case.

After describing the construction of the switching arrangement of FIG. 1, its operation will now be considered. For this purpose, it is it is assumed that in subscriber station Tn the handset has just been removed or, more generally, that the signal transmitter of subscriber station Tn starts emitting a route selection signal containing and address. This route selection signal, or the address signal bits producing the same, are fed via digital hybrid circuit $G_s$ and via switch S1, which is in the position shown in the drawing, as well as via OR element GO1, into the register stages of register Reg 1 provided therefor. When register Reg1 has accepted the number of address signal bits needed for establishing a connection to another subscriber station, or to a signal receiver of another subscriber station, this will cause switch S1 to be switched over.

The information signals, or information signal bits, then being delivered by the signal transmitter of subscriber station Tn are stored sequentially in the register stages of register Reg2. After a prespecified number of information signal bits have been stored in register Reg2, a "1" signal is applied to input e of control circuit St1, as mentioned above. In response to the "1" signal, control circuit St1 delivers, at its output a, a number of pulses corresponding to the number of register stages of register Reg1. In this connection it should be mentioned that the counter, which corresponds to counter C in control circuit S*t*3, must have a counting capacity corresponding to the number of register stages of register Reg1. In response to the appearance of the pulses at output *a* of control circuit S*t*1, the signal bits contained in the register stages of register Reg1 are shifted out of the register and appear in serial fashion at the output of register Reg1.

The foregoing signal bits are reapplied to the input of register Reg1 via OR element GO1, which means that register Reg1 is utilized as a circulating storage register. They also travel over OR element GO2 toward one input of setting circuit E*s*, which accepts them and tests with the aid of the address signal bits associated with the signal bits if the output of switching network K*f* designated by them and, hence, if a line leading toward a desired signal receiver, is available. If the line in question is available, the setting circuit finds a switching path in the switching network K*f* that has not yet been seized and through-connects the switching path only for the duration of the transmission of the information signal bits now in process. The processes performed in connection with the finding of a free switching path will not be described further. Basically, these processes are performed in the same way as described in the British Pat. No. 1,077,679, cited above.

After the signal bits have been completely shifted out of register Reg1, no further pulses appear at output *a* of control circuit S*t*1. However, output *b* of control circuit S*t*1 presently carries a "1" signal, which causes a "1" signal to be applied to input *e* of control circuit S*t*2 via the monostable trigger element MF during a well-defined period of time. This time period is governed by the period of time during which the monostable trigger element MF is in its unstable condition.

In response to the appearance of the "1" signal at input *e* of control circuit S*t*2, the bistable circuit thereof, corresponding to the bistable circuit FF in control circuit S*t*3, is set, with the result that pulses now appear at output *a* of control circuit S*t*2. Pulses appear at output *a* of control circuit S*t*2 in a number corresponding to the number of register stages of register Reg2. Therefore, the counter in control circuit S*t*2 corresponding to counter C in control circuit S*t*3 has a counting capacity corresponding to the number of register stages of register Reg2. After delivery of the number of pulses governed by the counting capacity of the counter of control circuit S*t*2, the information signal bits in register Reg2 are shifted out of the latter and coupled to a given output of said switching network K*f* via OR element GO2 and, where necessary, after buffering, over the through-connecting switching network K*f*. From the output of switching network K*f*, the information signal bits are applied to a desired signal receiver.

When all the information signal bits that have just been shifted out of register Reg2 have been transmitted over switching network K*f*, the connecting path heretofore through-connected therein for the transmission of the information signal bits is released. An appropriate through-connection of switching network K*f* does not occur again until the next appearance of the signal bits from register Reg1. This is the case if in register Reg2, again, a prespecified number of information signal bits have been placed into storage. In this case, processes fully corresponding to the processes just described above take their course.

The information signal bits appearing at an output of switching network K*f* travel over a line connected at that output to the input of a register corresponding to register Reg3 shown in FIG. 1.

For the sake of simplicity, the following considerations are to be taken in relation to the register Reg3 of FIG. 1. When register Reg3, or the register in the send-/receive circuit of the desired signal receiver corresponding thereto, has accepted information signal bits in a prespecified number — in the present case, this number may correspond to the number of register stages of register Reg3 — a "1" signal is applied to input *e* of associated control circuit S*t*3. In response to the input at *e* there appear at output *a* of the control circuit S*t*3 pulses from associated clock generator TG. After a number of pulses corresponding to the number of register stages of register Reg3, the delivery of the pulses from clock generator TG is stopped. This is caused by counter C in control circuit S*t*3, which has a counting capacity corresponding to the number of register stages of register Reg3. Owing to the pulses appearing at output *a* of control circuit S*t*3, the information signal bits read in register Reg3 are read out therefrom and fed to the desired signal receiver via hybrid circuit G*s* of FIG. 1. Although not shown in FIG. 1, steps may be taken to apply the information signal bits in the cycle shifted out or to be shifted out sequentially from register Reg3 to the associated signal receiver in which they have been sent out from the signal transmitter under consideration. After shifting the information signal bits out of register Reg3, this register is again ready to accept further information signal bits.

When the delivery of information signal bits from the signal transmitter of the subscriber station T*n* of FIG. 1 is completed, this is recognized by the test/reset circuit PR, and it resets, at its output, the register stages of register Reg1 used for accepting and storing information signal bits. Thus, the relevant register stages of register Reg1 are not loaded with address signal bits again until the signal transmitter of the subscriber station T*n* intends to establish a new connection in the direction of a signal transmitter.

With regard to the circuit arrangement of FIG. 1, it should be noted that, where necessary, registers corresponding to registers Reg2 and Reg3 may also be provided, and, as required, may be used to avoid loss of information, which could especially take place in the case of signal bit transmissions from the subscriber station occurring at relatively high frequencies. Moreover, the switching network K*f* could be provided at its input with temporary storage means for accepting the information signals to be transmitted by the switching network. In this way, signal losses occurring in some cases as a result of internal congestions of the switching network K*f* could also be avoided.

Finally, with respect to the control circuits S*t*1, S*t*2, and S*t*3 of FIG. 1, it should be noted that the clock generators contained therein must supply pulses at a pulse repetition rate at which the corresponding signal bits must appear at the output of the register in question.

Figure 2:
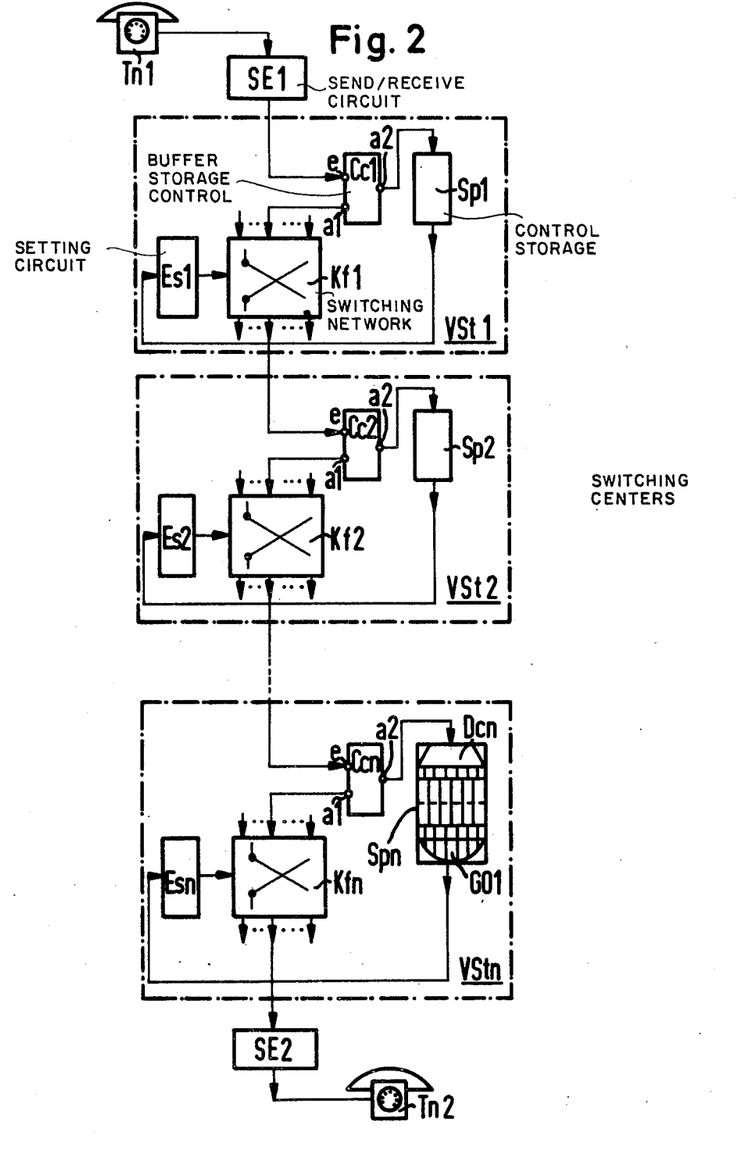
FIG. 2 is a schematic diagram of the structure of interconnected switching centers over which signals are to be transmitted from a signal transmitter to a signal receiver.

FIG. 2 shows a number of interconnected switching centers on a scale and in the detail necessary for understanding the invention. The switching centers involved are labelled VS*t*1, VS*t*2 and VS*tn*. A multiplicity of signal transmitters and signal receivers may be connected to the individual switching centers, whereby a signal transmitter and a signal receiver may be combined and, for example, be formed by a telephone subscriber set. In the present case, only two such subscriber sets are shown (T*n*1 and T*n*2), which are each connected to their associated switching center (VSt1 and VStn) over a separate send/receive circuit SE1 or SE2.

Before describing the individual switching centers and the processes performed therein, it should be noted that only the case is considered where the subscriber set Tn1 functioning as a signal transmitter provides signals that are to be fed to subscriber set Tn serving as a signal receiver. This means that the signal transmission occurs in one direction only. The processes described below are performed in similar fashion where it is a matter of also providing information signals from subscriber set Tn2 to subscriber set Tn1. Thusly directed signal transmissions play an important role in data systems engineering. In this case it will suffice for purposes of description to transmit signals from a terminal containing a signal transmitter to a terminal containing a signal receiver without transmitting signals in opposite direction between the two terminals.

Each of the switching centers VSt1, VSt2, VStn of FIG. 2 contains in each incoming circuit a buffer storage control circuit Cc1 or Cc2 or Ccn. A possible construction of such a circuit shown in FIG. 3 will be described further below.

In the present case, there is connected at an input e of the buffer storage control circuit Cc1 the send/receive circuit SE1, to which subscriber set Tn1 is connected. The buffer storage control circuit Cc1 is connected by an output a1 to an input of the switching network Kf1 associated with the switching center VSt1. The switching network is a space-division multiplex switching array, as is every switching matrix array of the switching networks associated with the remaining switching centers. A control storage Sp1 is connected at its input to a further output a2 of the buffer storage control circuit Cc1. There is connected to the output of the control storage, the importance of which will be discussed below, the input of a setting circuit Es1, through which the switching network Kf1 or the switching elements contained therein are set.

When signals are provided to the switching center VSt1 from the send/receive circuit SE1, the signals are accepted and temporarily stored by the buffer storage control circuit Cc1. These signals are not delivered from output a1 of circuit Cc1 before switching network Kf1 has been set. As mentioned above, the setting operation occurs by means of setting circuit Es1, which is activated from control storage Sp1. For this purpose, the address of the desired signal receiver, in this case the address of subscriber station Tn2, is fed to the control storage Sp1 from the buffer storage control circuit Cc1. Basically, the control storage is formed by some kind of allocation storage. This is illustrated in detail with reference to the switching center VStn of FIG. 2.

The control storage Spn provided in the switching center VStn comprises a storage that can receive by addresses, and in the individual storage locations of which an appropriate unit of setting information is stored for the associated switching network. The individual storage locations of the storage can be activated by the addresses of the signal receivers desired for each connection.

FIG. 2 includes a schematic diagram of the triggering of this storage. The address of the desired signal receiver is fed to a decoder Dcn shown as being allocated to control storage Spn. The units of information or setting information provided in response to the activation of the storage is fed to the input of the associated adjusting circuit Esn over an OR element GO1.

Other switching centers and signal receivers may be connected at the outputs of the switching network Kf1 associated with the switching center VSt1. In the present case, only switching center VSt2 is connected by its input to an output of switching network Kf1. The construction of said switching center VSt2 fully corresponds to that of switching center VSt1. This is also true of switching center VStn which in some cases must be connected at an output of switching matrix array Kf2 or switching center VSt2 over other appropriately constructed switching centers. The telephone subscriber set Tn2 is connected to an output of switching matrix array Kfn associated with switching center VStn over send-/receive circuit SE2 serving here as a signal receiver.

The general operation of the switching arrangement of FIG. 2 will be described hereinbelow.

First, it will be examined briefly how digital signals are emitted from signal transmitters to signal receivers in accordance with the method described hereinabove. According to this method, digital information signals that can be emitted in any time sequence from signal transmitters, together with an address signal preceding them and indicating a signal receiver intended for the acceptance of the information signals, via switching apparatus, toward the signal receiver designated by the address signal, are transmitted over the switching apparatus in the direction of a signal receiver designated by the address signal. In so doing, the information signals from the signal transmitter are stored prior to delivery to the switching apparatus. Only in the presence of a prespecified number of information signals from the signal transmitter are these information signals delivered to the switching apparatus, together with the address signal designating the desired signal receiver. In said switching apparatus a connection is established by the address signal between the input of the switching apparatus carrying the address signal and the information signals and the output of the switching equipment connected to the desired signal receiver, only for the duration of the transmission of the information signals.

In the present case, the switching apparatus is formed by the individual switching networks Kf1, Kf2 to Kfn associated with a plurality of interconnected switching centers VSt1, VSt2 to VStn of a telecommunication network. Stated another way, the switching apparatus mentioned above with reference to FIG. 1 is divided into individual switching networks. In this case, the information signals emitted by the signal transmitter Tn1 and gathered in the prespecified number in the associated send/receive circuit SE1 are delivered with their address signal designating the desired signal receiver into the buffer storage control circuit Cc1 that activates the switching network Kf1 over the control storage Sp1 and the setting circuit Es1. This is accomplished in a way that in switching network array Kf1 the input connected to the output a1 of the buffer storage control circuit Cc1 (and, hence, marked) and the output of the switching network Kf1 leading toward the other eligible switching center VSt2 are actuated only for the duration of the transmission of the signals stored in the buffer storage control circuit Cc1.

In case the switching network Kf1 is switched on, the signals are transmitted therethrough and stored in the buffer storage control circuit Cc2. In the switching center VSt2, too, the switching network Kf2 is switched on, only for the transmission of the signals. Similarly, the switching network Kfn of switching center VStn is also switched on only for the transmission of the signals stored in the associated buffer storage control circuit Ccn.

After turning on the respective switching networks Kf1, Kf2 or Kfn, the settings thereof are cancelled. New settings do not occur until corresponding address signal acceptance by the associated buffer storage control circuits have taken place. In this way, digital information signals are guided from a signal transmitter to a signal receiver successively, from switching center to switching center, whereby the connecting path is utilized that is stored in the individual control storages (e.g., in the form of setting data marking the switching matrix arrays only at the incoming and outgoing end). The control storages Sp1, Sp2 or Spn are so organized that for all the signal receivers accessible with the telecommunication network from their respective switching center they hold stored information concerning which switching center as the next switching center a signal transmission shall take place to a desired signal receiver.

In the course of a transmission of information signals from a signal transmitter to a signal receiver one can also proceed in the following manner: Prior, or in addition to the first transmission of information signals from the switching center at which the signal transmitter emitting such information signals is connected (i.e., the switching center VSt1 in the present case), to the switching center at which the desired signal receiver is connected (i.e., the switching center VStn in the present case), an address signal designating the signal transmitter Tn is transmitted from the first-mentioned switching center VSt1 to the second-mentioned switching center VStn, in addition to the address signal designating the signal receiver Tn2. These two address signals are then stored in the switching center VStn containing the desired signal receiver Tn2. For example, this may occur in a signal storage of the associated buffer storage control circuit arrangement. If such address signals are compared with corresponding address signals transmitted prior, or in addition, to a first transmission of information signals that shall be transmitted from another signal transmitter to the same signal receiver, with respect to which the first-mentioned address signals have already been stored, then double seizure of the signal receiver can be avoided in a relatively simple manner. That is, if the comparison of the address signals shows no agreement, it can be interpreted as an indication that the desired signal receiver is already seized or cannot now be seized.

If there is a request that in the switching arrangement under consideration the emission of information signals from the sending station Tn to the signal receiver Tn be terminated, an address signal designating the signal receiver Tn2 can be fed, together with an erase signal, to the switching center VStn. With the aid of these signals the information stored in the switching center VStn relative to signal transmitter Tn and signal receiver Tn2 can be erased. As a result, signal receiver Tn2 is again available for accepting information signals from other signal transmitters. Where necessary, a clearing signal indicating the termination of the application of the information signals may also be fed to signal receiver Tn2.

If there is a request that in the switching arrangement under consideration the signal receiver Tn2 be disconnected, or that no further information signals be sent from signal transmitter Tn, an erase signal can be transmitted from switching center VStn, together with the address signal designating signal transmitter Tn1, and still stored in said switching center VSt1. Then, an appropriate indicating signal can be provided from the switching center VSt1 to signal transmitter Tn1. In addition, in switching center VStn the information stored therein relating to signal transmitter Tn1 and signal receiver Tn2 is erased.

The transmission of the signals considered immediately above occurs similarly, as described above, with reference to the transmission of the information signals. This indicates that in this case, too, the switching networks in the switching centers are switched on only for the duration of the transmission of the signals.

After describing the construction and operation of the switching arrangement of FIG. 2, a preferred construction of the buffer storage control circuits contained in the individual switching centers will now be described with reference to FIG. 3.

Figure 3:
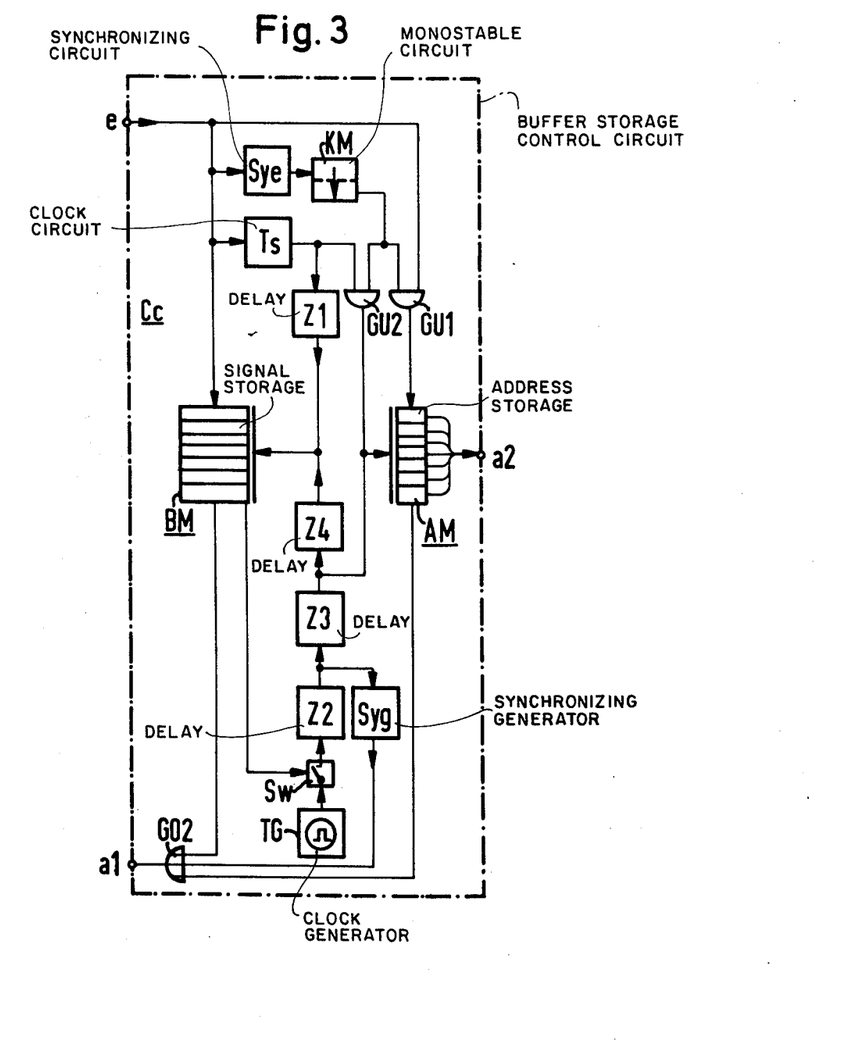
FIG. 3 is a schematic diagram providing details of the structure of a buffer storage control circuit provided in each switching center.

According to FIG. 3, each buffer storage control circuit Cc comprises an address storage AM for accepting and storing an address signal designating a signal receiver, e.g., the signal receiver Tn of FIG. 2. To achieve this, the address memory AM is connected to a signal input appearing at the output of an AND element GU1. The AND element GU1 is connected by one input to input e and by another input to the output of a monostable trigger element KM. Monstable circuit KM is activated by a synchronizing circuit Sye, the latter being connected by its input to input e. The synchronizing circuit Sye emits a "1" output signal whenever it detects the presence of a synchronous word in the signals fed thereto at the incoming end. It should be noted in this connection that the signals emitted or transmitted block-by-block can have the following composition: The 8 bits occurring first form a synchronous word, the following 8 bits form the address of a signal receiver, one bit serves for parity check, 3 bits serve to designate the type of information signals or bits to be fed to the signal receiver followed by a (prespecified, if necessary) number of information signal bits. As mentioned above, in response to the detection of a synchronous word contained in such a sequence of signals or bits, the synchronous circuit Sye emits a "1" output signal, in response to the appearance of which the monostable trigger element KM switches to its unstable state. The element KM emits a "1" signal from its output connected according to FIG. 3 within a period of time during which the bits producing the address of the signal receiver appear at input e of the control circuit Cc. As a result, the address signal bits, are coupled to the address memory AM within the required period of time.

A clock pulse circuit is likewise connected by its input to input e of the circuit Cc. Clock circuit Ts emits clock pulses at its output in response to the appearance of corresponding bits at input e. The clock pulses are fed to a clock pulse input of the address memory AM through AND gate GU2 within the period of time during which the monostable trigger element KM is in its unstable condition. The clock pulses fed to the clock pulse input cause the coupling of the information signal bits to the address storage.

The clock pulses emitted by the clock circuit Ts travel further over a delay element Z1 to the clock pulse input of a signal storage BM of the buffer storage control circuit Cc. The delay element Z1 is designed such that clock pulses do not appear until information signal bits start appearing at the clock pulse input of the signal storage BM. The information signal bits are fed to signal storage BM at an input which is connected to input e of control circuit Cc. Moreover, in some cases an address signal can be coupled to the signal storage BM in addition to the information signal bits. This address signal designates the signal transmitter from which the information signal bits have been emitted. As mentioned above, the address signal designating the signal transmitter and the address signal designating the signal receiver can be stored separately in the switching center to which the required signal receiver is connected.

The outputs of the address storage elements forming the address memory AM are connected to an output $a2$ of the buffer storage control circuit Cc. As described with reference to FIG. 2, the input of a control storage is connected to the output $a2$ which holds units of information stored for the purpose of setting the associated switching network and which releases them in response to its activation.

The address memory AM is further connected by a signal output to the output $a1$ of the buffer storage control circuit Cc via an OR element GO2. The output $a1$ of the buffer storage control circuit Cc is connected to an input of the associated switching network, as has been described with reference to FIG. 2.

The output of signal storage BM is connected to another input of OR element GO2. Furthermore, the output of a synchronizing generator Syg is connected to another input of OR element GO2. The synchronizing generator Syg serves to emit a synchronous word corresponding to the synchronous word received. To emit such a synchronous word, the synchronizing generator Syg is controlled at its input with appropriate clock pulses. The clock pulses are emitted by a clock generator TG via a delay element Z2. The proper clock pulses are first fed to the delay element Z2 at the instant at which a switch Sw inserted in the connection between clock generator TG and the input of delay element Z2 is closed. The switch Sw is connected by its switching input to a control output of signal storage BM. An enabling signal appears at the control output whenever information signal bits are written into the signal storage BM, preferably in a prespecified number. The delay time of delay element Z2 is determined such that upon expiration of the delay the setting of the switching matrix array is assured.

The clock pulses emitted by delay element Z2 are not only utilized for controlling synchronizing generator SYg, but also for activating another delay element Z3. At the output of delay element Z3, there is connected the clock pulse input of address register AM and the input of still another delay element Z4. The delay time of delay element Z3 is measured such that the emission of clock pulses from the output of the delay element Z3 does not begin until a synchronizing word has been emitted by the synchronizing generator Syg. The reading out of the address signal bits contained in address register AM is then initiated. After the address signal bits have been read out, the signal bits stored in signal storage BM are read out, viz. by applying appropriate clock pulse signals to the clock pulse input of the signal storage BM. Accordingly, delay element Z4 has a delay time which expires when the address signal bits are read out of the address register AM.

Thus, in the order of succession described above, synchronous word bits, address signal bits designating a signal receiver, information signal bits and, in some cases, address signal bits designating the signal transmitter are fed sequentially from output $a1$ of the buffer storage control circuit Cc to the associated switching network actuated for the transmission of the signal bits. Moreover, there may be stored at the same time in the address storage AM the one bit, mentioned above, for parity check and the 3 bits, likewise mentioned above, for designating the type of information signals or bits to be fed to the signal receiver, so that the bits are likewise retransmitted.

With respect to the delay elements used in the switching arrangement shown in FIG. 2, it should be noted that they are used to delay clock pulses fed thereto at the beginning of the retransmission, and they return to their initial state when no clock pulses appear at their inputs. This occurs automatically with respect to delay element Z1, whenever the information signal bits and, in some cases, the bits of the address signal designating the signal transmitter are written in the signal storage BM. With respect to the remaining delay elements, this occurs, because after reading out the appropriate signal bits from the signal storage BD, the switch Sw is open again, so that the retransmission of clock pulses by the clock generator TG is stopped.

With regard to the switching arrangement of FIG. 2, it should be noted that the send/receive circuits provided therein may be constructed like the send/receive circuit of FIG. 1. The switching networks and their associated setting circuits may be constructed in the manner shown in British Pat. No. 1 077 679.

With respect to the delay elements Z1 to Z4 of FIG. 3 and with respect to the monostable trigger element KM shown in the drawing, it should be noted that these circuits may be constituted by a clock-actuated counter having a subsequent decoder which emits an output signal at a specified output in response to the start-up of its associated counter. The period of time between the start-up of the counter and the appearance of an output signal from the associated decoder thus corresponds to the time lag required in each case.

Figure 4:
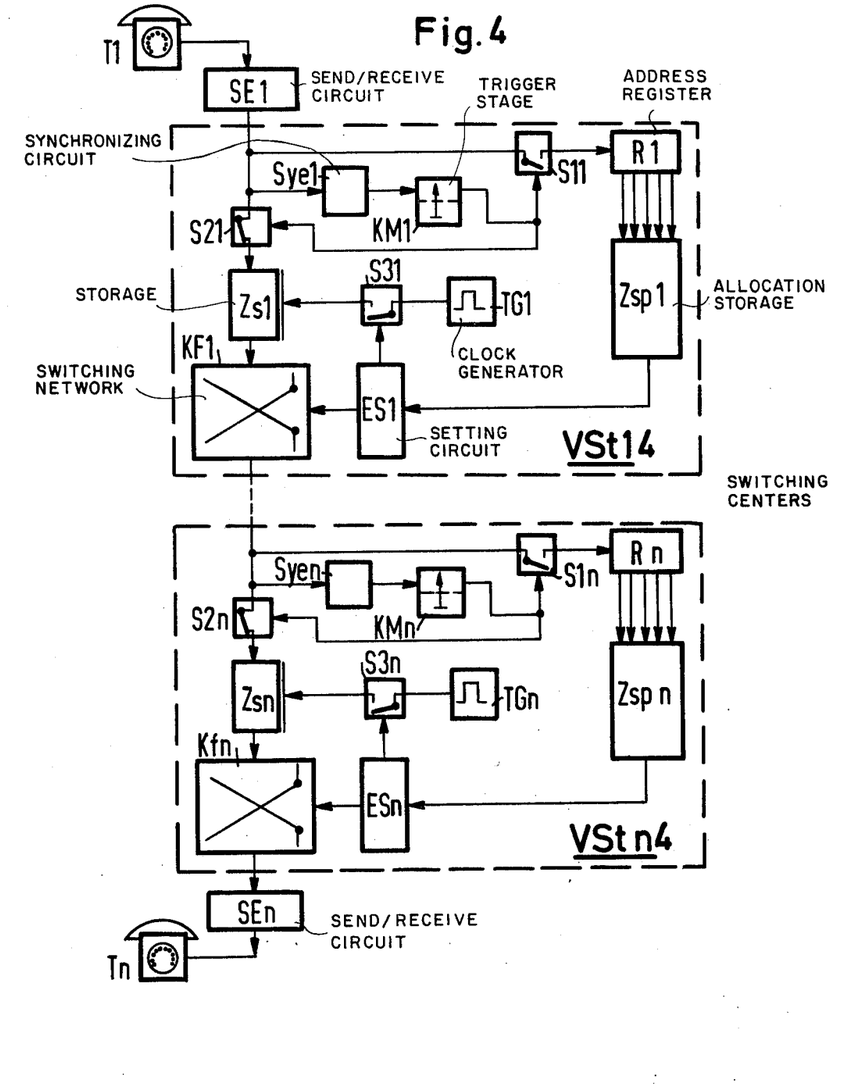
FIG. 4 is a schematic diagram of an alternate structure of interconnected switching centers over which signals are to be transmitted from a signal transmitter to a signal receiver.

Two other interconnected switching centers are shown in FIG. 4 in the detail necessary for understanding the invention. The two switching centers are labelled VS$t$14 and VS$tn$4. The switching centers may be connected either directly or over a number of other similarly constructed switching centers. A multiplicity of signal transmitters and signal receivers may be connected at the inidividual switching centers, whereby a transmitter and a signal receiver may be combined and may, for example, be formed by a telephone subscriber set. In the present case, only two such telephone subscriber sets are shown, i.e., subscriber set T1 and subscriber set T$n$. The subscriber sets T1 and T$n$ are each connected to their respective switching center (i.e., switching center VS$t$1 and VS$tn$4) by a separate send-/receive circuit SE1 or SE$n$. With respect to said send-/receive circuits it should be noted that they may be constructed in the manner shown in FIG. 1.

Before describing the individual switching centers and the operations performed therein, it should be noted that only the case is considered where subscriber set T$n$1 functioning as a signal transmitter emits signal that are to be fed to subscriber set T$n$ serving as a signal receiver. These signals are digital information signals. Addresses are emitted or transmitted in addition to the information signals, as will be shown below. In the present case, signal transmission occurs in one direction only. The operations which will be described below are performed in similar fashion where it is a matter of also providing information signals from the subscriber set Tn to the subscriber set T1. Thusly direct signal transmissions play an important role in data systems engineering. In this case it will suffice to transmit signals from a terminal containing a signal transmitter to a terminal containing a signal receiver without transmitting signals in the opposite direction between two terminals.

Since the individual switching centers may be similarly constructed, it suffices to describe the construction of one switching center only, e.g., switching center VSt14. Like symbols are used for like devices in both switching centers, whereby 1 or n shows the relationship to switching center VSt14 or VStn4, respectively.

Switching center VSt14 contains in each incoming circuit a temporary storage device Zs1 which, for example, may be a shift register. The shift register must have a number of shift register stages so that the maximum number of bits of the signals to be retransmitted from a switching center can be buffered. The signals to be transmitted from a switching center to another switching center of the telecommunication network may, for example, have the following maximum composition: 8 bits form a synchronous word, a maximum number of 10 addresses of 8 bits each form addresses of switching centers to be activated in the course of a signal transmission, 8 bits form the address of a required signal receiver, 1 bit serves for parity check, 3 bits serve to designate the type of information signals to be fed to the signal receiver, and 156 bits form the information signals, In this case, a shift register with 256 shift register stages in each switching center would suffice to ensure proper signal transmission.

The signals or bits to be retransmitted from the switching center VSt14 are fed to the temporary storage device Zs1 by a switch S21 which is closed in rest position. The switching input of the switch S21 is connected to an output of a delay element formed by a monostable trigger element KM1. The delay element may in some cases be formed by a clock-actuated counter having a subsequent decoder from which a signal is emitted opening the switch S21 only within the period during which the associated counter performs a counting operation. The counter may perform such a counting operation in response to a separate activation taking place from a synchronous word recognition circuit Sye1. The synchronous word recognition circuit Sey1 emits an appropriate control signal at the outgoing end whenever it has recognized a synchronous word in the signals fed thereto at the incoming end. As mentioned above, the bits producing the synchronous word appear in the assumed case as first bits in the train of bits.

In response to its activation, the monostable trigger element KM1, provided as a delay element in the present case, is in the unstable state within the period during which the first address of the addresses designating one after another the switching centers to be utilized in the course of the transmission of the signals from signal transmitter T1 to signal receiver Tn1, and the signal receiver Tn. The first address appears in direct response to the synchronous word. The addresses appear before the digital information signals to be transmitted in the signal receiving circuit. Basically, this may occur in the same way as has been described in connection with FIG. 1 with respect to the address signals and information signals.

In addition to the switching input of switch S21 mentioned above, the switching input of switch S11 is connected to the output of the trigger element KM1 carrying a "1" signal in the unstable state. While switch S21 is opened in response to the appearance of a "1" signal, at the output of the monostable trigger element KM1 mentioned above, switch S11 is closed. This signifies that the address appearing in response to the synchronous word is introduced into an address register R1. The inputs of an allocation storage Zsp1 are connected to the outputs of the individual register stages of the register Reg1. The allocation storage Zsp1 is thus activated in parallel by the address contained in address register R1.

Control information for a setting circuit ES1 of switching center VSt1 is contained in the allocation storage Zsp1. This control information indicates from which output of the switching network Kf1 associated with the switching center VSt1 signals must be retransmitted. After the input of switching network Kf1 has also been determined, the switching network Kf1 is marked at the incoming and outgoing end, so that the setting circuit ES1 can carry out the necessary setting or actuation of the switching network Kf1.

With regard to switching network Kf1, it should also be noted that it is a space-division switching network. The same is true of the switching networks in the remaining switching centers, of which only a portion is shown in the drawings. The operations relating to the setting or initiation of the individual switching networks will be described further below. However, with regard to the construction of the switching networks and the setting circuits associated therewith it should be noted that these arrangements may be effected in the manner shown in British Pat. No. 1 077 679.

The above mentioned setting circuit Es1 is connected by a separate control output to the switching input of a switch S31, which is normally open. The switch S31 connects the output of a clock generator TG1 to a control input of the temporary storage device Zs1. If the temporary storage device Zs1 is constituted by a shift register, the inputs of all the register stages of the shift register are connected to the output of clock generator TG1 via the switch S31. Then, a "1" signal is emitted from the setting circuit Es1 that closes switch S31 when the associated switching network Kf1 begins operating. Switch S31 may be closed sufficiently long until an adequate number of clock pulses have been emitted by clock generator TG1, so that all the signal bits are brought out of the temporary storage device Zs1. If the temporary storage device Zs1 is built like a shift register, switch S1 may, for example, be closed until clock generator TG1 emits to the inputs of the shift register stages a number of clock pulses corresponding to the number of shift register stages.

After describing the construction of the switching center VSt14, and thereby of VStn4, in FIG. 4 the operation of this apparatus will be described. For this purpose, let it be assumed that a train of signals or bits appear in serial fashion from the send/receive circuit. As mentioned above, the first 8 bits may produce a synchronous word, the following 80 bits may produce 10 address which designate a number of switching centers, the following 8 bits may produce the address indicating the required signal receiver, the next bit may be a parity bit, the following 3 bits may indicate the type of the following information signals and, finally, the next 156 bits may produce digital information signals.

The bits producing the synchronous word (i.e., the first 8 bits in the present case) travel to the temporary storage device Zs1 via the still closed switch S21. Also, the relevant synchronous word is recognized by the synchronous word recognition circuit Sye1. As a result, switch S21 is opened and switch S11 closed. The next 8 bits which produce the first address of all the addresses supplied are fed to address register R1. After acceptance of all the bits of the relevant address by address register R1, switch S11 is opened and switch S21 closed. The bits appearing next are all fed to temporary storage device Zs1, which accepts the bits or signals fed thereto, storing them until read-out signals or read-out pulses are applied thereto, as mentioned above. As noted earlier, such pulses are supplied by clock generator TG1 via switch S31. The read-out of the signals or bits from the temporary storage device Zs1 occurs whenever the associated switching network Kf1 is actuated.

In the present case, the signals or bits emitted from an output of switching network Kf1 are fed to other similarly constructed and similarly operating switching centers until finally a bit sequence composed as follows is fed to an input of switching center VStn4. The first 8 bits produce the synchronous word, the following 8 bits produce the address of the required signal receiver Tn, the next bit is the parity bit, the following 3 bits indicate the type of the following information signals and, finally, the following 156 bits represent the information signal bits.

These bits appear in the foregoing sequence immediately one after another at the one input of switching center VStn4.

In the switching center VStn4 operations corresponding to those described above with reference to switching center VSt14 are performed. The bits of the address of the required signal receiver Tn are stored in address register Rn. This address causes associated switching network Kfn to be actuated over associated allocation storage Zspn and setting circuit Esn, so that the signal bits contained in the temporary storage device are fed to the send/receive circuit SEn to which the signal receiver Tn is connected. The 8 bits of the synchronous word contained in temporary storage device Zsn are suppressed, or are not retransmitted, if send/receive circuit SEn of signal receiver Tn does not need the synchronous word.

It has been described above with respect to the transmission of the signals from switching center to switching center that for this purpose the switching network of the respective switching center is appropriately set. It has further been described that the setting of the switching networks takes place with the aid of addresses which are placed ahead in sequence of information signals to be transmitted from a signal transmitter to a signal receiver.

As indicated above, the addresses are placed ahead of the aforesaid information signals at the signal transmitter end, i.e., in the send/receive circuit to which the signal transmitter is connected. For this purpose, the send/receive circuits connected to each switching center may be connected to a separate storage circuit, which, in response to the acceptance of the address of a required signal receiver, emits the addresses of the switching centers, which in the course of the transmission of information signals from the signal transmitter, by which the activation of the storage has been brought about, to the desired signal receiver, shall be utilized. This assumes that the storage holds the addresses of the switching centers that shall be utilized by the switching center associated with the storage in the course of a signal transmission.

The switching networks in the individual switching centers over which signals are transmitted from a signal transmitter to a signal receiver are actuated only for the duration of the signal transmission. With respect to the above described conditions this signifies that the switching networks Kf1 and Kfn are only actuated until the signal bits contained in the temporary storage devices Zs1 and Zsn are read out and transmitted by way of the switching network. As noted above, in connection with the switching network Kfn one may proceed in such a manner that the 8 synchronous word bits contained in the temporary storage device Zn are not transmitted by way of the switching network Kfn if the send/receive circuit SEn of signal receiver Tn does not need the synchronous word. After transmission of the signal bits over the respective switching network the setting thereof is initiated again. A new setting of the respective switching network does not occur until appropriate signals are fed to the associated switching center.

In the course of a transmission of information signals from a signal transmitter to a signal receiver one may also proceed as follows: Before, or in addition to, the first transmission of information signals and addresses from the switching center to which the signal transmitter emitting such information signals is connected (i.e., switching center VSt14 in the present case) to the switching center to which the required signal receiver is connected (i.e., switching center VStn4 in the present case), an address designating the signal transmitter T1 is transmitted from the first-mentioned switching center VSt14 to the second-mentioned switching center VStn4. In addition, the addresses indicating the switching centers to be used in the course of the signal transmission from the signal transmitter to the signal receiver are transmitted. The address is stored in the switching center VStn4 at which signal receiver Tn is connected together with the address designating the required signal receiver Tn. This may, for example, occur in a separate storage of switching center VStn4.

When the foregoing addresses are compared with corresponding addresses that are transmitted before or in addition to a first transmission of information signals that shall be transmitted from another signal transmitter to the same signal receiver Tn with respect to which the first-mentioned addresses have already been stored, then a double seizure of the signal receiver Tn can simply be avoided. Double seizure does not occur if the comparison of addresses, i.e., of the already stored address of the signal transmitter and of the signal receiver and of the addresses of the signal receiver and of another signal transmitter shows no agreement. Lack of agreement can be interpreted as an indication that the required signal receiver is already seized or cannot now be seized.

If there is a request in the switching arrangement under consideration that the emission of information signals to signal receiver Tn from sending station T1 be terminated, an address designating the signal receiver Tn may be fed to switching center VStn4, together with an erase signal. In this case, too, the addresses of the switching centers at the signal transmitter end suitable for the transmission of the signals are provided in addition to the address and the erase signal. With the aid of the address of signal receiver Tn and of the erase signal, the information stored in switching center VS*tn*4 relating to signal transmitter T1 and signal receiver T*n* is erased. As a result, signal receiver T*n* is again available for acceptance of information signals from other signal transmitters. In some cases, a clearing signal indicating the termination of the application of information signals may also be fed to signal receiver T*n*.

If there is a request that in the switching arrangement under consideration the signal receiver T*n* be disconnected, or that no further information signals from signal transmitter T1 are needed, then an erase signal may be transmitted from switching center VS*tn*4, together with the address designating signal transmitter T1 and still stored in switching center VS*tn*4, to switching center VS*t*14 to which signal transmitter T1 is connected. For this purpose, the addresses of the switching centers suitable for a signal transmission from switching center VS*tn*4 to switching center VS*t*14 to which the signal transmitter is connected are likewise provided in addition to the address in question. This may occur in the same manner as described above with respect to the provision of addresses at the signal transmitter end. In addition to the operations considered immediately above, the information with respect to signal transmitter T1 and signal receiver T*n* stored in switching center VS*tn*4 at which signal receiver T*n* is connected, is erased.

The transmission of signals, either from the switching center at which the signal transmitter is connected to the switching center at which the signal receiver is connected, or from the switching center at which the signal receiver is connected to the switching center at which the signal transmitter is connected, occurs in the same manner as described above with respect to the transmission of the information signals. This signifies that in this case, too, the switching networks in the switching centers are actuated only for the duration of the transmission of the information signals and addresses, but are erased thereafter.

The principles of this invention are described hereinabove by describing preferred apparatus constructed accordingly and the principles of operation of that apparatus. It is to be remembered that the described apparatus and the described methods of operation are only exemplary and that modifications to or changes in them can be made while remaining within the scope of the invention, as defined by the appended claims.

I claim:

1. A method for serially transmitting digital communication signals from a signal transmitter in one subscriber station to a signal receiver in another subscriber station by means of a space division multiplex switching network, comprising the steps of:
   generating in said signal transmitter digital communication signals, each digital communication signal being constituted by an information signal and having an address signal prefixed thereto indicating the specific signal receiver to which the communication signal is to be transmitted,
   storing said address signal, prior to transmission, in a first storage means in said signal transmitter,
   storing said information signal, prior to transmission, in a second register in said signal receiver,
   transmitting said digital communication signal to said space division multiplex switching network when an information signal of a predetermined length has been stored in said second storage means, a plurality of said digital communication signals being transmitted in any time sequence and
   establishing a connection through said space division multiplex switching network in accordance with location information contained in said address signal, said connection being established between an input to the switching network receiving the digital communication signal from said signal transmitter and an output of the switching network coupled to said signal receiver in said other subscriber station having an address corresponding to the address signal, said connection being established only for the period of time during which said information signal portion of said digital communication signal is being transmitted.

2. The method defined in claim 1 wherein said switching apparatus comprises a plurality of switching networks, each of which is in one of a plurality of interconnected switching centers of a telecommunication network, and wherein said transmitting step is carried out such that said information signal along with said address signal is transmitted from the switching center at which the signal transmitter is located to another said switching center at which said predetermined signal receiver is located through others of said switching centers and comprising the further steps of:
   retransmitting said signals from a said switching center to another said switching center connected thereto in accordance with information held in said switching centers indicating the said switching center suitable as the next switching center for activation of said predetermined signal receiver and
   actuating the said switching networks in those of said switching centers determined to be suitable for retransmission of said signals only for the period during which said signals are being transmitted through them.

3. The method defined in claim 2 comprising the additional step of:
   transmitting, in addition to said transmission of information signals from the said switching center at which said signal transmitter is located, in addition to the said address signal designating said predetermined signal receiver, an additional address signal designating said signal transmitter and
   storing said address signal and said additional address signal in the said switching center to which said predetermined signal receiver is connected.

4. The method defined in claim 3 wherein said step of transmitting said information and address signals comprises additionally the transmission of an erase signal, and comprising the additional steps of:
   erasing, upon completion of transmission of said signals, information relative to said signal transmitter and to said signal receiver stored in said switching center where said signal receiver is located and
   producing a clearing signal indicating that the transmission of information signals to said predetermined signal receiver is completed.

5. The method defined in claim 1 comprising a plurality of switching networks, one of which is located in one of a plurality of interconnected switching centers of a telecommunication system, and wherein said transmitting step comprises transmitting said information signal, having a predetermined length, along with an address indicating said signal receiver from a said switching center to which the signal transmitter is connected to another said switching center in which said signal receiver is connected in accordance with addresses indicating the said switching centers of the telecommunication system to be used for signal transmission to said predetermined signal receiver, said addresses being added at the signal transmitter, and comprising the additional step of:

activating those of said switching networks needed for transmission of said signal from said signal transmitter to said signal receiver in sequence and only for the time period required for signal transmission through them.

6. The method defined in claim 5 comprising the additional step of:

excluding the address of a given switching network from further transmission when that switching network has been activated for signal transmission through it.

7. The method defined in claim 6 wherein the signals being transmitted include sequentially appearing addresses designating the said switching centers to be employed for a given signal transmission through the system, said addresses appearing in a sequence corresponding to the sequence of switching centers to be used, and comprising the additional steps of:

introducing a one of said addresses into an address register in that switching center designated by that address, activating a setting device in that switching center for controlling the said switching network associated therewith for transmission through that switching network and further transmitting said information signals and the remaining said address signals after an interval corresponding to the period required for setting the said switching network associated with said setting device.

8. The method defined in claim 5 comprising the further step of:

additionally transmitting an address designating the signal transmitter from which the information signals are emitted in addition to the address of said predetermined signal receiver and storing in the said switching center to which said predetermined signal receiver is connected the address of the said switching network to which the signal transmitter is connected along with the address of said signal receiver.

9. The method defined in claim 8 comprising the additional steps of:

producing an erase signal and transmitting it along with said information and address signals to the said switching center to which said predetermined signal receiver is connected, erasing the information stored in said stored step and emitting a clear signal indicating the termination of the transmission of information signals to said signal receiver.

10. The method defined in claim 8 comprising the additional steps of:

producing an erase signal in said switching center to which said predetermined signal receiver is connected when said predetermined signal receiver is disconnected or when no further said information signals are required, along with addresses indicating the signal transmitter and the switching centers to be used for transmission of said erase signal toward the said switching center to which the signal transmitter is connected, emitting a clearing signal from said switching center to which said signal transmitter is connected and erasing information relative to the signal transmitter and said predetermined signal receiver in the said switching center to which said signal receiver is connected.

11. Apparatus for transmitting digital information signals along with address signals indicating a predetermined signal receiver, which is capable of accepting said signals in any time sequence, from a signal transmitter through switching apparatus to said predetermined signal receiver, comprising:

space-division switching apparatus, signal receiver means, signal transmitter means for emitting information signals along with an address signal designating said signal receiver, send/receive circuit means connecting said signal transmitter and said signal receiver, respectively, to an input and an output of said switching apparatus, first storage means assigned to said signal transmitter for storing said address signal and a predetermined number of said information signals, second storage means assigned to said signal receiver means for storing said information signals transmitted through said switching apparatus, first control circuit means for initiating transmission of said signals stored in aid first storage means to said switching apparatus from said signal transmitter when a predetermined number of said information signals are stored in said first storage means and second control circuit means assigned to said second storage means for initiating the emission of said information signals received in said second storage means to said signal receiver when a predetermined number of said information signals are stored in said second storage means.

12. The apparatus defined in claim 11 wherein said first and second storages are constituted by binary registers.

13. The apparatus defined in claim 12 wherein said first storage means is constituted by two binary registers, one of which is capable of storing only said address signal designating said signal receiver and, as required, other signals designating the type of information signals to be coupled thereto, or synchronizing signals, and the other of which is capable of storing only the predetermined number of said information signals.

14. The apparatus defined in claim 12 wherein each said control circuit means comprises switch means, a clock generator connected by means of said switch means to control inputs of the said registers associated therewith, a counter connected by said switch means to the output of said clock generator, which counter has a counting capacity corresponding to the maximum number of signals said registers are capable of storing, a bistable circuit said counter having an output connected to a reset input of said bistable circuit, said bistable circuit having an output connected to a clock signal input of said switch means for initiating read-out of said binary registers.

15. The apparatus defined in claim 11 wherein said switching apparatus includes setting circuit means connected to inputs and outputs of said switching apparatus for sensing said address signal emitted by said signal transmitter, checking the state of the output of said switching apparatus designated by said address signal and completing a switching path for connecting the required switching apparatus input and output only for the duration of the transmission of said predetermined number of information signals.

16. The apparatus defined in claim 15 further comprising:
buffer storage control circuit means assigned to each said switching apparatus input for storing the said information and address signals to said switching apparatus until such time as said setting apparatus has caused a path to be completed through said switching apparatus,
additional control storage means having an input connected to an output of said buffer control circuit means for accepting therefrom the address of said signal receiver and thereafter emitting a signal to said setting circuit means causing said setting circuit means to complete the required path therethrough.

17. The apparatus defined in claim 16 wherein each said buffer storage control circuit means comprises address memory means for accepting and storing an address signal designating said signal receiver, and signal storage means for accepting said information signals appearing together with said address signals, and wherein, an output of said address memory means is connected to an input of said additional control storage means.

18. The apparatus defined in claim 17 wherein said additional control storage means is arranged such that information is stored therein for said signal receiver and for all portions of said switching apparatus required for completing a connection therethrough.

19. The apparatus defined in claim 15 further comprising:
temporary storage means connected to inputs of said switching apparatus, said temporary storage means being connected to receive signals coupled to said switching apparatus,
address register means connected to an input of said temporary storage means, and
allocation storage means, over which said address register means designates the output of said switching apparatus which corresponds to the address contained in said address register,
said temporary storage means emitting said information signals to said switching apparatus only after a time delay determined by the setting time required for said setting means to complete the required switching path through said switching apparatus.

* * * * *